US012755000B2

(12) United States Patent
Dhavala et al.

(10) Patent No.: US 12,755,000 B2
(45) Date of Patent: Oct. 6, 2026

(54) EFFICIENT AND LATENCY REDUCING TASK DISTRIBUTION USING TRUSTED EXECUTION ENVIRONMENTS

(71) Applicant: GOOGLE LLC, Mountain View, CA (US)

(72) Inventors: Akhil Dhavala, Palo Alto, CA (US); Shruti Murali, Sunnyvale, CA (US); Hari Krishna Bikmal, Santa Clara, CA (US); Michael Feng, San Mateo, CA (US); Oscar Ka Ho Chow, Richmond Hill (CA); Ouyang Zhang, Mountain View, CA (US); Jacob Mark Hallberg, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 139 days.

(21) Appl. No.: 18/860,186

(22) PCT Filed: Oct. 10, 2023

(86) PCT No.: PCT/US2023/034790
§ 371 (c)(1),
(2) Date: Oct. 25, 2024

(87) PCT Pub. No.: WO2025/080245
PCT Pub. Date: Apr. 17, 2025

(65) Prior Publication Data
US 2026/0187228 A1 Jul. 2, 2026

(51) Int. Cl.
*G06F 21/53* (2013.01)
*G06F 7/544* (2006.01)
*G06F 21/62* (2013.01)

(52) U.S. Cl.
CPC ............ *G06F 21/53* (2013.01); *G06F 7/5443* (2013.01); *G06F 21/6245* (2013.01)

(58) Field of Classification Search
None
See application file for complete search history.

(56) References Cited

U.S. PATENT DOCUMENTS 7,210,009 B2 4/2007 Gulick et al.
7,222,062 B2 5/2007 Goud et al.
(Continued)

OTHER PUBLICATIONS

International Search Report and Written Opinion in International Appln. No. PCT/US2023/034790, mailed on Apr. 10, 2024, 17 pages.

(Continued)

*Primary Examiner* — Kaveh Abrishamkar
(74) *Attorney, Agent, or Firm* — Fish & Richardson P.C.

(57) ABSTRACT

Methods, systems, and apparatus, including medium-encoded computer program products for selecting and displaying content in privacy preserving manners are described. A first trusted content platform (CP) that executes within a first trusted environment can receive a digital component (DC) response that can include: (i) data indicating constrained DCs and, for each constrained DC, distribution parameters; and (ii) data indicating at least one contextual DC selected according to contextual data. The first trusted CP can send to a second trusted CP a second DC request that can include set of constraining values and the distribution parameters. The first trusted CP can receive from the second trusted CP, data indicating (i) one or more constrained DCs selected and (ii) selection values generated based on the set of constraining values. The first trusted CP can select a DC based on a selection value for each contextual DC and the selection value.

20 Claims, 4 Drawing Sheets

(56) References Cited

U.S. PATENT DOCUMENTS

| | | | | |
|---|---|---|---|---|
| 8,082,551 | B2 | 12/2011 | Ibrahim et al. | |
| 8,086,852 | B2 | 12/2011 | Bade et al. | |
| 8,117,642 | B2 | 2/2012 | Covey et al. | |
| 8,396,746 | B1 | 3/2013 | Wang | |
| 8,429,685 | B2 | 4/2013 | Yarvis et al. | |
| 8,832,452 | B2 | 9/2014 | Johnson et al. | |
| 8,863,252 | B1 * | 10/2014 | Katzer | H04W 12/128 709/224 |
| 8,874,485 | B2 | 10/2014 | Partridge et al. | |
| 8,935,746 | B2 | 1/2015 | Vetillard | |
| 9,189,653 | B2 | 11/2015 | Thom et al. | |
| 9,298,897 | B2 | 3/2016 | Broadstone et al. | |
| 9,594,927 | B2 | 3/2017 | Zimmer et al. | |
| 10,366,237 | B2 | 7/2019 | Zimmer et al. | |
| 11,082,234 | B2 | 8/2021 | Becker et al. | |
| 12,530,446 | B2 * | 1/2026 | Rath | G06F 21/53 |
| 2010/0107218 | A1 | 4/2010 | Kurien et al. | |
| 2013/0060601 | A1 | 3/2013 | Kodialam et al. | |
| 2014/0316902 | A1 * | 10/2014 | Le Jouan | G06Q 30/0251 705/14.66 |
| 2016/0036826 | A1 | 2/2016 | Pogorelik et al. | |
| 2018/0373881 | A1 * | 12/2018 | Thom | H04L 9/0643 |
| 2019/0045207 | A1 * | 2/2019 | Chen | G06F 21/44 |
| 2019/0342336 | A1 * | 11/2019 | Finkelstein | G06F 21/6245 |
| 2022/0035922 | A1 * | 2/2022 | Yang | G06F 21/74 |
| 2022/0084074 | A1 | 3/2022 | Maddern et al. | |
| 2022/0398345 | A1 * | 12/2022 | Kravitz | G06F 3/0482 |
| 2023/0050222 | A1 * | 2/2023 | Wang | G06F 21/6263 |

OTHER PUBLICATIONS

International Preliminary Report on Patentability in International Appln. No. PCT/US2023/034790, mailed on Apr. 23, 2026, 12 pages.

* cited by examiner

EFFICIENT AND LATENCY REDUCING TASK DISTRIBUTION USING TRUSTED EXECUTION ENVIRONMENTS

CROSS-REFERENCE TO RELATED APPLICATION

This application is a National Stage Application under 35 U.S.C. § 371 and claims the benefit of International Application No. PCT/US2023/034790, filed Oct. 10, 2023. The disclosure of the prior application is considered part of and is incorporated by reference in the disclosure of this application.

TECHNICAL FIELD

This specification relates to data security, data privacy, and efficiently performing computing tasks using trusted execution environments.

BACKGROUND

A trusted execution environment (TEE) provides a secure environment for computation and is sometimes implemented as a secure area of a main processor. A TEE can guarantee that code and data loaded inside the TEE are protected with respect to integrity and confidentiality. Integrity indicates that unauthorized entities cannot alter code and/or data within the TEE, and confidentiality indicates that unauthorized entities cannot read code and/or data within the TEE.

SUMMARY

This specification describes technologies that increase the speed and efficiency at which computing tasks are performed by distributing tasks among different types of execution environments including trusted execution environments (TEEs). In general, executing tasks in a TEE is more resource intensive than executing the same tasks in a general-purpose environment, e.g., by a computer's main operating system. For example, applications that run in a TEE can be separated from other applications and resources of the computer using cryptographic and other functions that can require significant computations that introduce additional latency to execution of the applications. However, a TEE provides enhanced security of sensitive data, such as user data for which the security is critical.

The techniques described in this specification leverage one or more TEEs and general purpose computing environments (e.g., server class computers) to efficiently and quickly select and distribute relevant content to users based on sensitive user data without compromising user privacy or data security. To select relevant content while enhancing user privacy, sensitive user data may only be stored in TEEs when stored away from the user's device in cleartext, and it is not released to or accessible in cleartext to untrusted platforms such as untrusted content platforms and digital component providers. Storing and evaluating user data only in TEEs, e.g., TEEs of trusted content platforms, when off of the user's device ensures user privacy while also enabling delivery of content relevant to a user.

Delivering relevant content can reduce the demand on computing resources. For example, since users need not load additional content when the relevant content satisfies their needs, fewer packets will traverse the network, servers process fewer requests (saving both processing and power), and client devices issue fewer requests (saving processing and power). Such savings are additionally beneficial when the client device is a mobile device, which can be connected to bandwidth-constrained cellular networks (increasing the importance of bandwidth savings) and run on battery (increasing the importance of reducing additional requests).

However, as discussed above, executing computing tasks in TEEs is resource intensive and adds latency to the process. For example, the cryptography used to protect data can involve substantial computing resources to process. Therefore, implementing all techniques using only TEEs can be undesirable, especially in content distribution workflows in which content has to be selected and sent to client devices in milliseconds or errors (e.g., page load errors) may occur.

When latency causes such delays in providing digital components, undesirable behavior at a client device can result. For example, a delay responding to a request can result in page load errors at the client device or cause portions of an electronic document, e.g., web page, or other resource to remain unpopulated even after other portions of the electronic document are presented at the client device. Also, as the delay in providing the digital component to the client device increases, it is more likely that the electronic document will no longer be presented at the client device when the digital component is delivered to the client device, thereby negatively impacting a user's experience with the electronic document. Further, delays in providing the digital component can result in a failed delivery of the digital component, for example, if the electronic document is no longer presented at the client device when the digital component is provided.

Using the techniques described in the specification, untrusted content platforms, which can operate using substantially less computing resources, can perform operations that do not risk compromising user privacy or the security of other confidential information or code. For example, untrusted platforms can collect candidate digital components using only non-private data (e.g., no user data) and provide those candidate digital components to one or more trusted content platforms, and the trusted content platforms can determine the relevance of the component to the user and/or generate data that is used to select a digital component from multiple candidate digital components. The trusted content platforms can include a TEE in which user data is processed in cleartext to ensure that such data is not exposed outside the TEE. This approach enables accurate selection of relevant content using sensitive data and effectively limits the use of computationally intensive resources to operations that involve sensitive data, resulting in fast and efficient content selection and distribution while also enhancing user privacy and data security.

In general, one innovative aspect of the subject matter described in this specification can be embodied in methods including the operations of receiving, by a first trusted content platform that executes within a first trusted execution environment, a digital component selection response related to a first digital component request sent by a client device, the digital component selection response including: (i) data indicating a set of constrained digital components and, for each constrained digital component, distribution parameters that condition distribution of the constrained digital component; and (ii) data indicating at least one contextual digital component selected according to contextual data related to an environment in which a selected digital component will be displayed; sending, by the first trusted content platform and to a second trusted content platform that executes within a second trusted execution environment, a second digital component request including a set of constraining values corresponding to the first digital component request and the distribution parameters for each constrained digital component in the set of constrained digital components; receiving, by the first trusted content platform and from the second trusted content platform, data indicating (i) one or more constrained digital components selected based on the set of constraining values and, for each of the one or more constrained digital component, (ii) a selection value generated by the second content platform based on the set of constraining values; selecting, by the first trusted content platform and from a set of candidate digital components that includes the at least one contextual digital component and the one or more constrained digital components, a given digital component based on a selection value for each contextual digital component and the selection value for each of the one or more constrained digital components; and sending the given digital component to a first untrusted content platform for distribution to the client device.

These and other implementations can each optionally include one or more of the following features. In some aspects, the distribution parameters for each constrained digital component can include an initial selection value and the selection value for each constrained digital component can include an updated selection value that is generated by updating the initial selection value based on the constraining values for the constrained digital component. Updating the initial selection value can include adjusting the initial selection value based on relevance of at least one constraining value of the set of constraining values to at least one distribution parameter for the constrained digital component. Updating the initial selection value can include adjusting the initial selection value based on a computed dot product of a vector representing distribution parameters for the constrained digital component and a vector representing the set of constraining values. Updating the initial selection value can include adjusting the initial selection value based on matching at least one constraining value of the set of constraining values to at least one distribution parameter for the digital component.

In some aspects, constrained digital components for which a set of constraint criteria is not satisfied to form a set of filtered digital components can be removed and selecting from the set of candidate digital components can include selecting from the set of candidate digital components that excludes the constrained digital components for which a set of constraint criteria is not satisfied. The user data can be encrypted. The first trusted content platform and the first untrusted content platform can be operated by a first entity, and each second trusted content platform can be operated by a same second entity as a corresponding second untrusted content platform. The first trusted execution environment can be the same as the second trusted execution environment. The first trusted execution environment can be different from the second trusted execution environment.

Some aspects can include receiving, by the first untrusted content platform and from a client device, the first digital component request including the contextual data and user data related to a user of the client device; providing, by the first untrusted content platform and to one or more second untrusted content platforms, a third digital component request including the contextual data and that does not include the user data; receiving, by the first untrusted content platform from the one or more second untrusted content platforms, respective digital component selection responses including (i) respective sets of constrained digital components and corresponding distribution parameters and (ii) respective contextual digital components; and providing, by the first untrusted content platform and to the first trusted content platform, fourth digital component request including at least a portion of the respective digital component selection responses received from the one or more second untrusted content platforms.

Some aspects can include sending, by the first trusted content platform and to a respective second trusted content platform corresponding to each second untrusted content platform, fourth respective second digital component request; and receiving one or more candidate digital components from each respective second trusted content platforms, wherein the set of candidate digital components can include the one or more candidate digital components received from each second trusted content platform.

As background, historically, third-party cookies (e.g., cookies from a different domain than the resource being rendered by a client device) have been used to collect data from client devices across the Internet. However, some browsers and device platforms block the use of third-party cookies and third-party cookies are increasingly being removed from use, thereby preventing the collection of data using third-party cookies. This creates a challenge when attempting to utilize collected data to make inferences, segment data, or otherwise utilize data to enhance online browsing experiences, e.g., by selecting content relevant to users based on the data collected using third-party cookies. In other words, without the use of third-party cookies, much of the data previously collected is no longer available, which prevents computing systems from being able to use that data to group users based on shared user attributes or activities performed by the users at particular web pages or other resources, to enhance the online experience for users, and/or to display relevant content to users.

Particular embodiments of the subject matter described in this specification can be implemented to solve challenges that arise from the eradication of third-party cookies. Using the techniques described in this specification, relevant digital components can be delivered to a user's device without compromising user privacy. Data that are potentially sensitive are stored and accessible in cleartext only on trusted content platforms (or the user's device), where such data are unavailable to untrusted content platforms, thereby protecting privacy. Since the data are present on TEEs of trusted content platforms, the data are available to determine content relevant to a user, a user's request, a client device, and so on, while still preserving user privacy by preventing dissemination of private data.

In addition, particular embodiments of the subject matter described in this specification can be implemented to address challenges that arise from the computing resources required to operate trusted computing platforms. For example, trusted computing platforms often use compute-intensive cryptographic techniques, which can require substantial processor and power resource. By assigning operations that do not compromise user privacy to untrusted content platforms, the techniques of this specifically both reduce the processor resources required and reduce the amount of energy demanded and consumed by such resources. Thus, the techniques described in this document can distribute the operations of a process to select and distribute digital components between trusted platforms that include TEEs for processing sensitive data and untrusted platforms (e.g., general purpose servers) in ways that reduce latency and resource consumption while enhancing user privacy and data security.

The details of one or more embodiments of the subject matter described in this specification are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

In general, this document describes systems and techniques for selecting digital components for display at client devices in ways that are both resource efficient and that protect user privacy by determining relevant content without providing user data to untrusted content platforms and/or to unaffiliated web sites. Ensuring the privacy of user data, e.g., personal data of a user, is a requirement of many computing systems, especially those connected to public networks such as the Internet. Some consumers who do not trust that strong privacy protection will be enforced by a system will simply choose not to use that system.

However, while it is important to protect user privacy, it remains beneficial to display to a user content relevant to or of interest of users. The techniques described in this specification use trusted computing platforms to determine relevant content without compromising user privacy, and without enabling untrusted content platforms, digital component providers, or other entities to track the user's activity across multiple web sites or other resources. Thus, the techniques both deliver relevant content and protect user privacy fast and efficiently, as described further below.

In addition, delivering relevant content also improves resource efficiency, including reducing the use of power by client devices, servers and network devices (e.g., routers and switches). As described above, when relevant content is delivered, client devices issue fewer requests, less data (requests and responses) flow across a network (preserving bandwidth and reducing power use by routers and switches), and servers process fewer requests. Since request volume across the Internet is staggeringly large, the aggregate savings across requests can be substantial.

The techniques of this specification encourage delivery of relevant content by obtaining candidate content from multiple content providers, and selecting the content expected to be most relevant. The specification describes techniques that can be used to obtain both contextual digital components and constrained digital components as candidates for display at a client device of a user. A contextual digital component is selected based on the context in which it will be displayed (e.g., small screen, video, etc.), and a constrained digital component is selected based on user attributes (e.g., general location, age, etc.). Importantly, the user data that is employed to evaluate the constraints associated with a constrained digital component never leave trusted platforms in unencrypted form, thereby preserving user privacy. By considering both types of digital components in different environments, the techniques increase the likelihood that relevant content is displayed while also efficiently using computing resources and reducing the latency in delivering the content to the user.

Figure 1:
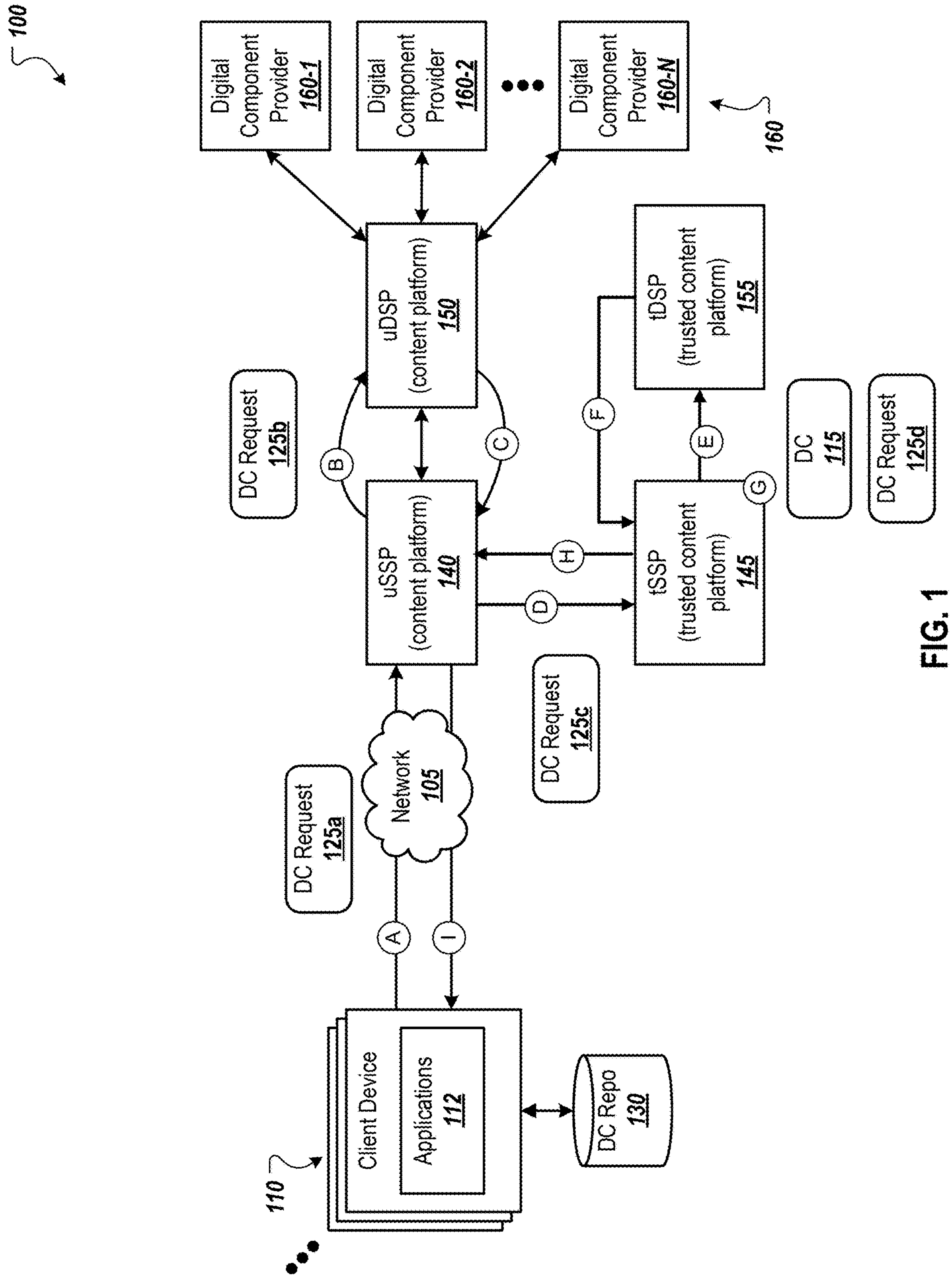
FIG. 1 is a block diagram of an example environment in which digital components are selected and distributed to client devices in a privacy preserving manner.

FIG. 1 is a block diagram of an example environment 100 in which digital components 115 are selected for client devices 110 in a privacy preserving manner. The environment 100 includes a data communication network 105, such as a local area network (LAN), a wide area network (WAN), the Internet, a mobile network, or a combination thereof. The data communication network 105 connects client devices 110 to content platforms, which can include supply side platforms (SSPs) 140, 145 and/or demand side platforms (DSPs) 150, 155.

Each content platform 140, 145, 150, 155 can be a trusted content platform 145, 155 or an untrusted content platform 140, 150. For example, an SSP 140, 145 can be an untrusted SSP (uSSP) 140 or a trusted SSP (tSSP) 145, and a DSP 150, 155 can be an untrusted DSP (uDSP) 150 or a trusted DSP (tDSP) 155.

An SSP 140, 145 is a technology platform implemented in hardware and/or software that automates the process of obtaining digital components 115 for the resources. Publishers of resources can use an SSP 140 to manage the process of obtaining digital components 115 for digital component slots of its resources. Each publisher can have a corresponding SSP 140, 145 or multiple SSPs 140, 145. Some publishers may share the same SSP 140, 145.

A DSP 150, 155 is a technology platform implemented in hardware and/or software that automates the process of distributing digital components 115 for display with the resources and/or applications. A DSP 150, 155 can interact with multiple supply-side platforms SSPs 140, 145 on behalf of digital component providers 160 to provide digital components 115 for display with the resources of multiple different publishers. Digital component providers 160 can create (or otherwise publish) digital components 115 that are displayed in digital component slots of publisher's resources.

A trusted content platform (tCP), such as tSSP 145 and tDSP 155, is an environment for executing code on a computing platform in which the environment ensures that the code is isolated from the computing platform, providing confidentiality of the code. The computing platform can provide the tCP using hardware, software or a combination of hardware and software. For example, each tCP can include a TEE in which computing tasks performed by the tCP are performed. In some implementations, a tCP includes a hardware isolation mechanism that runs a secure operating system, and the secure operating system runs applications, thus providing isolation for the applications. Third parties can inspect the operating system code, allowing such parties to confirm the isolation properties. Thus, use of tCP ensures that data stored on the tCP cannot be accessed by outside entities, thereby protecting user privacy. For example, a TCP can use cryptographic techniques to ensure that access to data and to code is limited to authorized parties.

An untrusted platform, such as uSSP 140 and uDSP 150, does not provide similar trust guarantees. For example, a server that executes tasks using a conventional operating system typically operates as an untrusted platform. However, while untrusted platforms do not provide the same isolation guarantees, they can be quite secure, including using anti-virus, firewalls, process isolation and other security features.

In some implementations, uDSP 140 and tDSP 150 are operated by, or on behalf of, a first entity, and uSSP 140 and tSSP 145 are operated by, or on behalf of, a second entity. That is, one entity provides both the trusted and untrusted SSP functionality, and similarly, one entity provides both the trusted and untrusted DSP functionality. In this way, a DSP can select candidate digital components to provide in response to a request in two different environments and using two different types of data. This is in contrast to digital component distributions systems in which all of the functionality of an SSP of an entity is implemented on a single computer or multiple instances of the same computing environment and in which all of the functionality of a DSP of an entity is implemented on a single computer or multiple instances of the same computing environment. Further, to simplify the diagram, FIG. 1 shows requests flowing from a single uSSP 140 to a single uDSP 150, but uSSP 140 can send requests to any number of uDSPs 150 that are each operated by different entities, e.g., different entities that provide candidate digital components for display to users on behalf of digital component providers 160.

The network 105 can also connect the various content platforms 140, 145, 150, 155 to one another and/or to digital component providers 160, e.g., to servers of the digital component providers 160. Thus, content platforms 140, 145, 150, 155 can distribute digital components of multiple digital component providers 160 to client devices 110. Further, while the digital component providers 160 are illustrated as outside the content platforms 140, 145, 150, 155, a content platform 140, 145, 150, 155 can both contain digital component providers 160 and communicate with digital component providers 160 via the network 105 that are outside the content platform 140, 145, 150, 155.

A client device 110 is an electronic device capable of requesting and receiving online resources over the network 105. Example client devices 110 include personal computers, gaming devices, mobile communication devices, digital assistant devices, augmented reality devices, virtual reality devices, and other devices that can send and receive data over the network 105. A client device 110 typically includes a user application, such as a web browser, to facilitate the sending and receiving of data over the network 105, but native applications (other than browsers) executed by the client device 110 can also facilitate the sending and receiving of data over the network 105.

A gaming device is a device that enables a user to engage in gaming applications, for example, in which the user has control over one or more characters, avatars, or other rendered content presented in the gaming application. A gaming device typically includes a computer processor, a memory device, and a controller interface (either physical or visually rendered) that enables user control over content rendered by the gaming application. The gaming device can store and execute the gaming application locally, or execute a gaming application that is at least partly stored and/or served by a cloud server (e.g., online gaming applications). Similarly, the gaming device can interface with a gaming server that executes the gaming application and "streams" the gaming application to the gaming device. The gaming device may be a tablet device, mobile telecommunications device, a computer, or another device that performs other functions beyond executing the gaming application.

Digital assistant devices include devices that include a microphone and a speaker. Digital assistant devices are generally capable of receiving input by way of voice, and respond with content using audible feedback, and can present other audible information. In some situations, digital assistant devices also include a visual display or are in communication with a visual display (e.g., by way of a wireless or wired connection). Feedback or other information can also be provided visually when a visual display is present. In some situations, digital assistant devices can also control other devices, such as lights, locks, cameras, climate control devices, alarm systems, and other devices that are registered with the digital assistant device.

A client device 110 can include applications 112, such as web browsers and/or native applications, to facilitate the sending and receiving of data over the network 105. A native application is an application developed for a particular platform or a particular device (e.g., mobile devices having a particular operating system). Although operations may be described as being performed by the client device 110, such operations may be performed by an application 112 running on the client device 110 and/or by an operating system running on the device 110.

The applications 112 can display electronic resources, e.g., web pages, other electronic documents, application pages, or other application content, to a user of the client device 110. The electronic resources can include digital component slots for displaying digital components 115 with the content of the electronic resources. A digital component slot is an area of an electronic resource (e.g., web page or application page) for displaying a digital component 115. A digital component slot can also refer to a portion of an audio and/or video stream (which is another example of an electronic resource) for playing a digital component 115.

An electronic resource is also referred to herein as a resource for brevity. For the purposes of this document, a resource can refer to a web page, application page, application content displayed by a native application, electronic document, audio stream, video stream, or other appropriate type of electronic resource or electronic document with which a digital component 115 can be displayed.

As used throughout this document, the phrase "digital component" refers to a discrete unit of digital content or digital information (e.g., a video clip, audio clip, multimedia clip, image, text, or another unit of content). A digital component 115 can electronically be stored in a physical memory device as a single file or in a collection of files, and digital components 115 can take the form of video files, audio files, multimedia files, image files, or text files and include advertising information, such that an advertisement is a type of digital component 115. For example, the digital component 115 may be content that is intended to supplement content of a web page or other resource displayed by the application 112. More specifically, the digital component 115 may include digital content that is relevant to the resource content (e.g., the digital component 115 may relate to the same topic as the web page content, or to a related topic). The provision of digital components 115 can thus supplement, and generally enhance, the web page or application content.

Where this specification describes providing a digital component 115, a person of ordinary skill will recognize that a reference to a digital component can be provided in addition to the digital component 115 or instead of the digital component 115. Examples of references can include Uniform Resource Locators (URLs) and Uniform Resource Identifiers (URI). In cases where a reference to a digital component 115 is provided instead of the digital component 115 itself, the digital component reference can be used to obtain the digital component 115, e.g., by downloading the digital component from a location indicated by a URL or URI.

A digital component 115 can also include, or be associated with, distribution parameters for the digital component. In general, distribution parameters contribute to (e.g., trigger, condition, or limit) the distribution/transmission of the corresponding digital component. For example, the distribution parameters can contribute to (e.g., trigger) the transmission of a digital component by requiring that a digital component request include at least one criterion that matches (e.g., either exactly or with some pre-specified level of similarity) a constraint criterion of the digital component. Distribution parameters can also include the category of digital component, e.g., whether it is constrained or contextual, as described further below.

Constraint criteria can be any functional specification that, when evaluated by a content platform 140, 145, 150, 155, produces one or more values, which can be, for example, numbers or Boolean values. The constraint criteria for a digital component 115 can include private and non-private criteria. Examples of non-private constraint criteria can include distribution keywords that must be matched (e.g., by electronic documents, document keywords, or terms specified in a digital component request 125*a*, 125*b*, 125*c*, 125*d*) in order for the digital component to be eligible for presentation. (For brevity, digital component requests 125*a*, 125*b*, 125*c*, 125*d* are collectively referred to as "digital component request 125." Additionally, or alternatively, non-private constraint criteria for a digital component 115 can include contextual parameters that condition eligibility of the digital component 115 based on characteristics of the environment in which the digital component 115 will be displayed. The contextual parameters can be based on the resource (e.g., the URL of a web page) for which a digital component is requested, keywords and/or topic(s) of the resource, a geographic region of the client device 110 for which a digital component is requested, the types of the client device (e.g., mobile device or tablet device) a number of digital components slots of the resource, the type(s) of digital component slots, the location on the resource of the digital component slots, the page viewport, the user scrolling speed, and/or other contextual data. Similar to the keywords, a digital component 115 may be eligible for distribution to the client device 110 if the contextual data of the digital component request matches the contextual parameters for the digital component. Non-private constraint criteria can be evaluated at untrusted content providers, such as uDSPs, although they can also be evaluated at trusted content providers, such as tDSPs.

Private constraint criteria are evaluated in the context of potentially-private user data, and are therefore only evaluated by trusted components such as trusted uDSP 155. Examples of private constraint criteria can include criteria related to demographic information (e.g., user age range, gender, etc.), known or inferred topics of interest, groups that include the user as a member, user activities at resources, and/or other appropriate data. To preserve user privacy, when off the user's device, the values for the private constraint criteria are only stored and evaluated in cleartext within trusted environments. Such data may also be stored in trusted environments and/or in encrypted form on the user's device. When such values must traverse a network connection, strong encryption is applied.

In some implementations, the distribution parameters for a digital component 115 can include negative criteria that renders the digital component ineligible if a keyword or contextual parameter matches a corresponding parameter of the digital component request 125. For example, a digital component provider 160 can specify, in the distribution parameters, that a digital component is not eligible for display on a particular web page or in a particular geographic region.

The distribution parameters for a digital component 115 can also include one or more selection values (e.g., one or more importance scores associated with the digital component) and constraint criteria associated with the digital component. A selection value can represent an amount that a digital component provider 160 is willing to provide to a publisher of a resource in exchange for the digital component 115 being presented with the resource.

As noted above, the private constraint criteria for a digital component 115 can be based on user data. For example, one private constraint criterion might indicate an age range that is likely to find the digital component 115 or a resource linked to by the digital component interesting. In another example, a private constraint criterion can specify one or topics (e.g., travel, finance, soccer) of interest. For example, the private constraint criteria for a digital component 115 can include one or more user interest group identifiers that identify one or more corresponding user interest groups for which the digital component is eligible and/or one or more user interest group identifiers that identify one or more corresponding user interest groups for which the digital component is not eligible. Note that private constraint criteria are associated with digital components 115 and therefore provide no information about any actual user, so constraint criteria do not compromise privacy. Instead, the private constraint criteria are evaluated based on actual user data in a trusted environment, e.g., a TEE. A digital component 115 associated with private constraint criteria based on user data or other sensitive data can be referred to as a constrained digital component. In other words, a constrained digital component is a digital component for which distribution of the digital component is conditioned at least on private constraint criteria, and optionally on non-private constraint criteria as well.

As noted above, digital components 115 can have associated contextual data that describes the context in which a digital component 115 should be displayed. Such contextual data can specify, for example, the device type, display size, device capabilities, and position of rendering, among many other examples. As described below, contextual data included in a digital component request can be evaluated with contextual data associated with a digital component 115 when determining what digital components 115 to include in a digital component response and/or when determining what digital component(s) 115 to render. A digital component 115 that is associated with contextual criteria, but not with private constraint criteria, can be referred to as a contextual digital component.

A client device 110 can also include, or be coupled to, a digital component repository 130, which can be any storage system appropriate for storing digital components 115. For example, the digital component repository 130 can be a persistent storage system such as a database or file system, or a transient storage system such as a dedicated area of random access memory (RAM). Although shown as being part of or coupled to the client device 110, the digital component repository 130 can be part of or coupled to one of the content platforms, 140, 145, 150, 155.

When the application 112 loads a resource that includes a digital component slot, the application 112 can generate a digital component request 125 that requests a digital component 115 for display in the digital component slot. In some implementations, the digital component slot and/or the resource can include code (e.g., scripts) that cause the application 112 to request a digital component 115 from an SSP 140, 145. A digital component request 125 sent by a client device 110 can include non-sensitive data, such as contextual data, generic keyword and/or a query string. However, sensitive data can be excluded from the digital component request 125.

In cases where sensitive data is included, the sensitive data are encrypted, as described above. For example, the client device 110 can encrypt the sensitive data using a public key for the tDSP 155. Upon receipt of the encrypted data, the tDSP 155, the tDSP can decrypt the data using the private key for the tDSP 155. The client device 110 can store the user data in storage (e.g., a solid state drive) of the client device 110. The user data can be stored at the user device in encrypted form or in cleartext.

In cases where the client device 110 provides the user data to multiple tDSPs, the client device 110 can separately encrypt the user data using the public key for each tDSP and each tDSP can decrypt the user data using its private key that corresponds to (e.g., that is mathematically linked to) its public key. Other types of encryption and decryption, including other types of encryption and decryption keys can also be used.

Further to the descriptions throughout this document, a user may be provided with controls (e.g., user interface elements with which a user can interact) allowing the user to make an election as to both if and when systems, programs, or features described herein may enable collection of user information (e.g., information about a user's social network, social actions, or activities, profession, a user's preferences, or a user's current location), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

An example process for selecting and providing a digital component 115 for display at a client device 110 is illustrated in stages A-I, which illustrate a flow of data between the components of the environment 100.

In stage A, the application 112 sends a digital component request **125*a* over the network 105 to a content platform, such as a uSSP 140. As described above, the application 112 can send a digital component request 125*a* to request a digital component 115 for display in a digital component slot of a resource being displayed by the application 112. The digital component request 125*a*** can include contextual data and/or user data.

In some implementations, the application 112 encrypts the user data before including the user data in the digital component request **125*a*. For example, the application 112 can encrypt the user data using an encryption key of a tDSP 155 from which a digital component is being requested. In this way, only the tDSP 155 can access the user data in cleartext such that the security of the data is preserved during transmission from the client device to the tDSP. Cleartext is text that is not computationally tagged, specially formatted, or written in code, or data, including binary files, in a form that can be viewed or used without requiring a key or other decryption device, or other decryption process. If multiple tDSPs 155 are going to be given the opportunity to provide one or more candidate digital components for selection in response to the digital component request 125*a*, the application 112 can encrypt the user data using a corresponding encryption key for each tDSP 155**.

In stage B, the uSSP 140 forwards the digital component request **125*b* to one or more uDSPs 150. If user data (which is encrypted) is included in the digital component request 125, the uSSP 140 removes and stores the user data before forwarding the digital component request 125*b*. Note that since the user data are encrypted, forwarding the user data may not introduce a privacy exposure, but would result in extra network traffic. In some implementations, the uSSP 140 can generate a new digital component request 125*b* that does not include the encrypted user data instead of removing the encrypted data and forwarding the digital component request 125*b***.

Each uDSP 150 can obtain digital components 115 from one or more digital component providers 160. Each uDSP 150 can provide the digital component request **125*b*, or data derived from or relating to the digital component request 125*b*, to the digital component providers 160. For example, the uDSP 150 can provide the contextual data for the digital component request 125*b* to the digital component providers 160**.

In some implementations, the uDSP 150 can store the digital components and/or the distribution parameters for digital components 115 of the digital component providers 160. The uDSP 150 can use the distribution parameters (e.g., the non-private constraint criteria of the distribution parameters) to select contextual digital components to include in the digital component selection response. The uDSP 150 can select constrained digital components (e.g., using the non-private constraint criteria) and include the selected constrained digital components and the private constraint criteria for the constrained digital components in the digital component selection response.

In response, the digital component providers 160 can provide, to the uDSP 150, digital components 115 that are responsive to the request from the uDSP 150. For example, the digital component providers 160 can provide digital components 115 appropriate to the contextual data such as the location of the device matching a location criterion for the digital component. For example, if a digital component request 125 is for an image appropriate for a small screen (e.g., a cell phone screen), the digital component providers 160 can provide image digital components 115 that are formatted for a small screen and not provide video digital components 115. The obtained digital components 115 can include at least one contextual digital component 115 and one or more constrained digital components. In some implementations, the obtained digital components 115 can include only one or more constrained digital components.

In addition, in some implementations each digital component provider 160 can provide, for each digital component 115, or for any subset of the digital components 115, distribution parameters. In some implementations, the uDSP 140 can obtain distribution parameters using other techniques, such as retrieving them from a database or other storage system.

Providing the digital component request **125*b* to the uDSP 150 in this way enables the entity that operates the uDSP 150 and the tDSP 155 to provide both contextual digital components that are eligible for distribution to the client device 110 based on the contextual data of the digital component request 125*a* and constrained digital components that may be eligible based on the user data of the digital component request 125***a*. However, the uDSP 150 does not receive or have access to the user data in cleartext. Instead, the uDSP 150 provides distribution parameters that include private constraint criteria in its response to the digital component request 125*b*. This enables the tDSP 155 to generate a selection value for any of the constrained digital components that are eligible for distribution to the client device 110 based on the user data in a TEE, as described in detail below.

In stage C, the uDSP 150 can provide a response that includes the digital components 115 (or data referencing the digital components) and distribution parameters for any constrained digital components to the uSSP 140. This response can include zero or more contextual digital components and zero or more constrained digital components. For example, the response can include one or more contextual digital components and/or one or more constrained digital components.

In stage D, the uSSP 140 provides the response received from the uDSP 150 to the tSSP 145. The uSSP 140 can further provide the digital component request 125*c* (which can be the same as digital component request 125*a*) or data derived from the digital component request 125*c* (e.g., contextual data) to the tSSP 145. The uSSP can further provide, to the tSSP 145, the digital components 115 (or data referencing the digital components 115) and the stored encrypted user data from the digital component request 125*a* (as described in reference to stage B).

In stage E, the tSSP 145 can provide digital component request 125*d* (which can be the same as digital component request 125*c*), digital components 115 (which can be the constrained digital components 115 or both the constrained and contextual digital components 115 if both are provided by the uDSP 150), distribution parameters, and constraining values to the tDSP 155. Constraining values can include private user data (e.g., the encrypted user data received in the digital component request 125*a*) and can be used to determine relevance of digital components to a user. However, since constraining values are passed only among trusted content platforms, private information is not revealed.

Note that while the tSSP 145 and the tDSP 155 are shown as separate components, the operations performed by the tSSP 145 and the tDSP can be performed by a single trusted component.

The tDSP 155 can use the distribution parameters and constraining values to refine the list of candidate digital components 115. For example, as described in more detail with reference for FIG. 2B, the tDSP 155 can filter one or more digital components 115 from consideration and determine the selection values for the remaining one or more digital components 115 that remain after the filtering. In some implementations, the tDSP 155 can determine the selection value for a constrained digital component by adjusting (e.g., increasing or decreasing) an initial selection value that is part of the distribution parameters for the constrained digital component. For example, the uDSP 150 can generate the initial selection value, e.g., based on the contextual data of the digital component request 125*b*, for a constrained digital component and include the initial selection value in the distribution parameters for the constrained digital component.

In stage F, the tDSP 155 can provide the remaining digital component(s) 115 (e.g., digital components 115 that were not filtered) or data referencing these digital components and distribution parameters (which can include adjusted selection values) for the digital components to the tSSP 145.

In stage G, the tSSP 145 can select one or more digital components 115 from among a set of candidate digital components. The set of candidate digital components can include the digital component(s) 115 received from the tDSP 155 (e.g., constrained and/or contextual digital components 115 provided by the tDSP after filtering) and optionally candidate digital components received from other tDSPs or other uDSPs. For example, stages tSSP B-G can be performed for multiple DSPs to generate the set of candidate digital components. The tSSP 145 can select the digital component(s) 115 based on the selection values. For example, the tSSP 145 can select the digital components 115 having the highest selection value or a highest score that is based on the selection value and a predicted performance (e.g., predicted interaction rate) of the digital component.

In stage H, the tSSP 145 can send the selected digital components 115 to the uSSP 140. In stage I, the uSSP 140 can provide the selected digital component(s) to the client device 110 for rendering. The client device 110 can also provide the selected digital component(s) 115 to one or more applications 112 and/or store the digital component(s) 115 in a digital component repository 130.

Figure 2A:
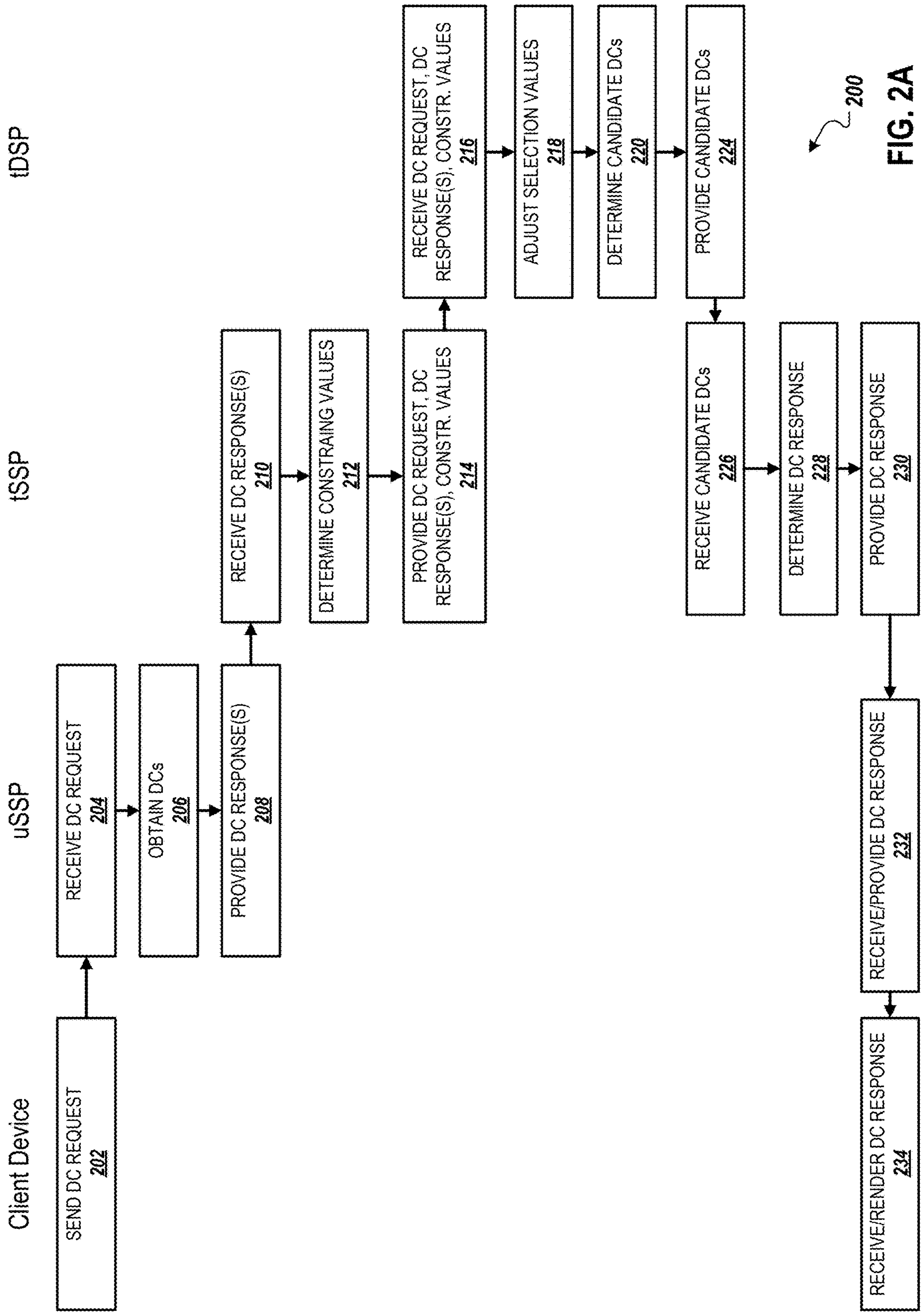
FIG. 2A is a flow diagram of an example process for privacy-preserving content selection.

FIG. 2A is a flow diagram of an example process 200 for privacy-preserving content selection. For convenience, the process 200 will be described as being performed by components of environment of FIG. 1, e.g., client devices 110 and content platforms 140, 145, 150, 155 of FIG. 1 appropriately programmed to perform the process 200. Operations of the process 200 can also be implemented as instructions stored on one or more computer readable media, which may be non-transitory, and execution of the instructions by one or more data processing apparatus can cause the one or more data processing apparatus to perform the operations of the process 200. One or more other components described herein can perform operations of the process 200.

A client device sends (202) and a uSSP receives (204) a digital component request that requests one or more digital components for display at the client device. The uSSP can be referred to as a first untrusted content platform. An application running on the client device can generate the digital component request in response to various operations on the client device, including rendering a resource that includes a digital component slot, in response to a user action (e.g., submitting a query, opening an application, interacting with an application, etc.), or another operation.

Throughout this specification, when information (e.g., a digital component request) is provided by one component and received by another component, the corresponding providing and receiving operations can be performed using any appropriate technique. For example, if the providing component uses HyperText Transfer Protocol (HTTP) or HTTP-Secure (HTTP-S), the receiving component can use the corresponding HTTP or HTTP-S operations to receive the information. In another example, the providing component can make a Remote Procedure Call (RPC) to the receiving component, and the RPC operation results in the transfer of the data. Message passing techniques, such as passing data over a TCP/IP socket from the providing component to the receiving component, can also be used. A person of ordinary skill will recognize that other techniques for passing data can also be used.

In addition, while parts of this specification describes as one example a single uSSP, the digital component request can be provided to multiple content platforms, e.g., to multiple DSPs and/or combinations of one or more DSPs and one or more SSPs. Content platforms can also distribute digital components provided by multiple digital component providers.

The digital component request can include contextual data describing or otherwise relating to an environment in which the digital component will be displayed and encrypted user data, as described above.

The uSSP can obtain (206) digital components. The obtained digital components can include a set of one or more constrained digital components and, for each constrained digital component, distribution parameters that condition distribution of the constrained digital component. As described above, the distribution parameters for each constrained digital component can also include a selection value. The obtained digital components can include one or more contextual digital components selected based on the contextual data of the digital component request.

Figure 2B:
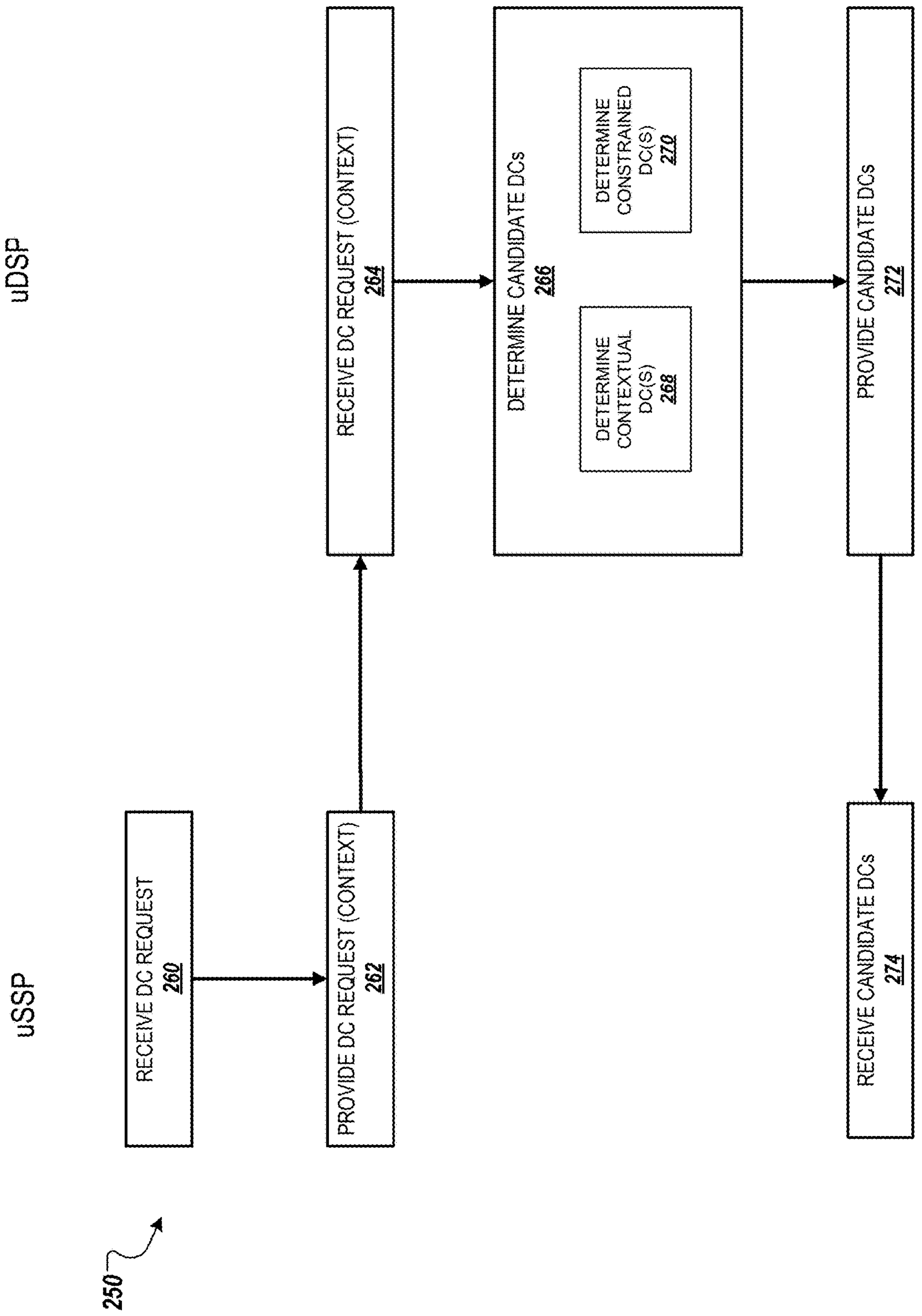
FIG. 2B a flow diagram of an example process for obtaining digital components.

As illustrated in FIG. 2B, a flow diagram of an example process 250 for obtaining digital components, in some implementations, multiple untrusted content platforms (uSSPs and uDSPs) can be used to obtain digital components. For convenience, the process 250 will be described as being performed by components for obtaining digital components, such as a uSSP (e.g., uSSP 140), which can be referred to as a first untrusted content platform, and a uDSP (e.g., uDSP 150 of FIG. 1), which can be referred to as a second untrusted content platform appropriately programmed to perform the process 250. Operations of the process 250 can also be implemented as instructions stored on one or more computer readable media, which may be non-transitory, and execution of the instructions by one or more data processing apparatus can cause the one or more data processing apparatus to perform the operations of the process 250. One or more other components described herein can perform operations of the process 250.

The uSSP receives (260) a digital component request and provides (262) the digital component request to at least one second uDSP (or other untrusted content platform), which receives (264) the digital component request. The uDSP can be referred to as a second untrusted content platform. As described above, the uSSP removes the encrypted user data from the request (or generates a new request that does not include the encrypted user data) before providing the request to the uDSP. The digital component request can include contextual data describing the environment in which the digital component will be rendered. In some implementations, the uSSP can be executed by the same physical computer, or by the same cloud computing system, as any number of the other untrusted content platforms. In addition, process 250 can be performed by multiple uSSPs (e.g., multiple uSSPs 140 of FIG. 1).

Each uDSP that receives the digital component request determines (266) a digital component response that includes candidate digital components and distribution parameters for at least some of the candidate digital components, e.g., for any constrained digital components included in the response. The candidate digital components can include: (i) one or more constrained digital components and/or (ii) one or more contextual digital components. As described above, the distribution parameters for a digital component can include constraint criteria that describe characteristics of a device user to whom a particular digital component should or should not be displayed. For example, as described above, private constraint criteria can specify that the digital component should be shown only to users that are interested in a particular and/or not to users that are interested in a particular topic.

Each uDSP can determine (268) at least one contextual digital component. Each uDSP can evaluate the contextual data included in the digital component request and contextual criteria associated with the digital components, or a subset of the digital components, available to the uDSP. In some implementations, the uDSP can process all or a subset of the contextual data using a machine learning model that is configured to produce a prediction that indicates the relevance of the digital component to the digital component request. In some implementations, the uDSP can select as the contextual digital component the digital component with the highest predicted relevance. In some implementations, the uDSP can select as contextual digital components all digital components for which the prediction satisfies a configured threshold.

Each uDSP can determine (270) constrained digital components. The uDSP can use various techniques for determining the constrained digital components. For example, the uDSP can provide digital components relevant to particular user segments, such as users who are 18 to 24 years of age, users who have an interest in a particular sport, users interest in shoes, among many other examples. The uDSPs do not have access to specific information about device users (e.g., users' ages), so the uDSPs provides constraints on using the constrained digital components to a trusted content platform, and the trusted content platform can determine whether those constraints are satisfied, as described below.

In some implementations, when there are multiple uDSPs, only a subset of the uDSPs determine a contextual digital component. Similarly, uDSP can determine the same or different numbers of contextual digital components and constrained digital components.

The uDSP(s) can provide (272) and the uSSP can receive (274) the determined candidate digital components (constrained and/or contextual). The uDSP can also provide one or more selection values, each associated with one or more of the determined candidate digital components. The selection values can be used, at least in part, by a trusted content provider when determining a digital component to render, as described further below. As some selection values can be adjusted by the tDSP, these selection values can be referred to as initial selection values.

Returning to FIG. 2A, uSSP can provide (208) digital component response(s) containing the digital components (which can include constrained digital components and contextual digital components, e.g., as determined by process 250 of FIG. 2B) and a tSSP can receive (210) the digital component response(s). The tSSP can be referred to as a first trusted content platform.

The tSSP can determine (212) constraining values for the digital components in the digital component response(s). Since the tSSP is trusted, it can store information about the user, which can be used as constraining values. User privacy is preserved since such information is maintained only on trusted content platforms and is not provided to any untrusted parties, including untrusted content platforms and digital component providers.

As described above, in some implementations, user data can be encrypted using the private key of the tDSP and therefore would not be available to the tSSP. In such cases, the tSSP can provide the encrypted user data to the tDSP and request that the tDSP decrypt the user data. For example, the tDSP can include an Application Programming Interface (API) used by the tSSP to provide the encrypted data, request decryption, and receive the decrypted data.

In some implementations, encryption can be performed using a secret key shared among the client device, tSSP and tDSP. In such cases, the tSSP can decrypt the user data. Other encryption mechanisms can also be used.

In some implementations, the tSSP can parse the constraint criteria to determine which constraining values are required to evaluate the constraint criteria and determine the relevant constraining values. For example, if a constraint criterion specifies an age, and the tSSP has access to an age or age range, the tSSP can determine that the age (or age range) is to be provided. If the tSSP does not have one or more constraining values relevant to the constraint criteria, such constraining values are not provided. In some implementations, the tSSP be provided all constraining values known to the uSSP.

The tSSP can provide (214) to a tDSP the digital component request, the digital component response(s) or a subset of the digital component response(s), constraining values, or any combination thereof. The tDSP can receive (216) that information from the trusted first content platform. The tDSP can be referred to as a second trusted content platform. In some implementations, the tSSP provides a subset of digital component requests that contains only constrained digital components, and stores the contextual digital components for use in operation 228, as described below.

The tDSP can adjust (218) selection values for the digital components, or for a subset of the digital components. As described above, a selection value is a relevance measure that indicates a determined relevance of a digital component to a digital component request. In some implementations, the tDSP receives an initial selection value that indicates an initial determined relevance of a digital component to the digital component request, and the tDSP can determine a selection value by adjusting the initial selection value based at least in part on the constraining values. Note that in the case where no initial selection value has been set for a digital component (e.g., the value is NULL) tDSP can adjust the selection parameter from the undefined (or NULL) value.

The tDSP can use various techniques to adjust the selection values. In some implementations, the tDSP can adjust the selection values based at least in part on matching and/or relevance. For example, the tDSP can increase the selection value by a configured percentage (e.g., 1%, 5%, 10%, etc.) for each constraint criterion satisfied by the constraint values for the digital component. In some implementations, the tDSP can increase the selection value based on prior user behavior. For example, if a user visited sites assigned to a particular category or topic of interest (e.g., shoes, soccer, travel, etc.), and a constraint criterion relates to the category, the selection value can be increased based on the number of visits by the user to sites assigned to the category. Information relating to such visits can be included in user data that is provided (in encrypted form) by the client device to the tDSP. In some implementations, the relevance score can be decreased if constraining values do not exist for constraint criteria.

Since many factors can influence the adjustment to the relevance score, in some implementations, the tDSP can adjust a selection value based at least in part on a computed dot product of the factors influencing the adjustment (e.g., alignment of constraining values and constraint criteria). For example, for each user parameter (e.g., age, location, topic of interest, web page visited), a first vector can contain a user value representing whether the user data contains that feature (e.g., location can be 1 or 0 depending on whether the user in that location, interest can be 0.9 if interested or 0.1 if not). A second vector can represent the candidate digital component, and includes the same features, but weighted according to the digital component (e.g., if the digital component is designated as relevant to a location, the vector contains a 1 value, and if not then the vector contains a 0). A dot product of the two vectors is computed and used as the selection value, or used to adjust the selection value.

In some implementations, the tDSP can create a first embedding vector from the candidate digital component using a deep neural network (DNN) that has been trained to generate embedding vectors from candidate digital components and a second embedding vector from the user parameters using a DNN that has been trained to generate embedding vectors from user parameters. The tDSP can adjust or determine a selection value based at least in part on a computed dot product of the first embedding vector and the second embedding vector.

In some implementations, the tDSP can adjust a selection value at least in part using a DNN that has been trained to produce selection value adjustments. The tDSP can process an input that contains one or more candidate digital components and/or the user parameters to produce an adjustment value, In some implementations, the tDSP can generate a selection value using a DNN that has been trained to produce selection values. The tDSP can process an input that contains one or more candidate digital components and/or the user parameters to produce the selection value. Combinations of the techniques described in this specification can also be used, as can alternate techniques (alone or in combination with the techniques described herein).

The tDSP can apply the adjustment value to the selection value to produce an adjusted selection value using one or more of various techniques. For example, the selection value can be linearly scaled by the adjustment value. In another example, the adjustment value can be added to the selection value. Other techniques for adjusting the selection using the adjustment value can be used.

The tDSP can determine (220) candidate digital components. In some implementations, the tDSP can use the initial and/or adjusted selection values to determine the DC response. For example, the candidate digital components can include all digital components with a selection value that satisfies a threshold; the candidate digital components can include a configured number of digital components (e.g., the N digital components with the highest selection values; or the candidate digital components can include a configured number of digital components, but only if the relevance score for those components satisfies a threshold. Other techniques can also be used.

In some implementations the tDSP can remove from the set of constrained digital components, and using the constraint criteria and constraining values, constrained digital components for which the set of constraint criteria is not satisfied, to form a set of filtered digital components. The tDSP can use various techniques for removing constrained components. For example, the tDSP can remove the digital component from consideration if a constraining value does not satisfy a constraint criterion; if constraining values do not exist for a configured number of constraint criteria; if the number of a times a constraining value satisfies constraint criteria does not satisfied a configured threshold (e.g., at least 2 constraint criteria must be satisfied; etc. In some implementations, such factors can be considered both when filtering digital components, and for digital components that are not filtered, when adjusting the relevance score. The candidate digital components can be selected from the digital components that were not filtered, e.g., using the selection values, described above.

The tDSP can provide (224) the candidate digital components and the uSSP can receive (226) the candidate digital components. The candidate digital components can include a proper subset of the set of the constrained digital components selected based on the set of constraining values and, for each constrained digital component, an updated selection value generated by the tDSP based on the set of constraining values. A proper subset of a set Sis a subset of S that contains fewer values than S contains. The candidate digital components can also include the contextual digital component(s).

From the candidate digital components, the tSSP can determine (228) a digital component response. The tSSP can use the selection values to determine a digital component response. For example, the tSSP can include in the digital component response only the digital component with the highest selection value.

As described above, in some implementations, the uSSP provides only constrained digital components to the tSSP in operation 208. In such implementations, the uSSP adds the contextual digital components to the set of candidate digital components before determining the digital component response, which is determined from the candidate digital components received in operation 226 and the digital components stored in operation 214. Additionally, the set of candidate digital components can include digital components received from other tDSPs and/or other uDSPs.

The tSSP can provide (230) the digital component response to uSSP, which can receive the digital component response and provide the digital component response (232) to the client device. The client device can receive and render (234) the digital component response.

As described above, operations of the processes 200 and 250 are distributed between trusted and untrusted content platforms. For example, operations that are performed using sensitive data (e.g., sensitive user data) are performed by trusted content platforms, e.g., a uDSP, that have enhanced security (e.g., a TEE) relative to untrusted content platforms. Operations that are performed without using sensitive data are performed by unstrusted content platforms, e.g., a uSSP and/or uDSP, that may be secure, but less secure than trusted content platforms. This enables the processes 200 and 250 to be performed in ways that enhance the security of sensitive data while also being performed quickly and efficiently. Operations that do not require enhanced security and the additional computation that comes with the enhanced security are performed in less secure environments where the computations are performed faster and more efficiently.

For example, since operations 204, 206, 208, 232 and 234 of FIG. 1A and operations 260 to 274 of FIG. 1B can be performed by untrusted content platforms where less computation is required, computing resources are preserved relative to performing these operations in TEEs. Specifically, as described above, the digital component request does not include sensitive information, or if it does, the private information that is included is in encrypted form, such that sensitive information is not evaluated in these operations.

Operations 210 to 230 of FIG. 1A can involve the evaluation of sensitive user data, and therefore are performed by trusted platforms (e.g., tSSPs and tDSPs). While the computation requirements are higher on trusted content platforms (as compared to using untrusted content platforms, e.g., uDSP and uSSPs), the additional computation results in improved privacy.

Figure 3:
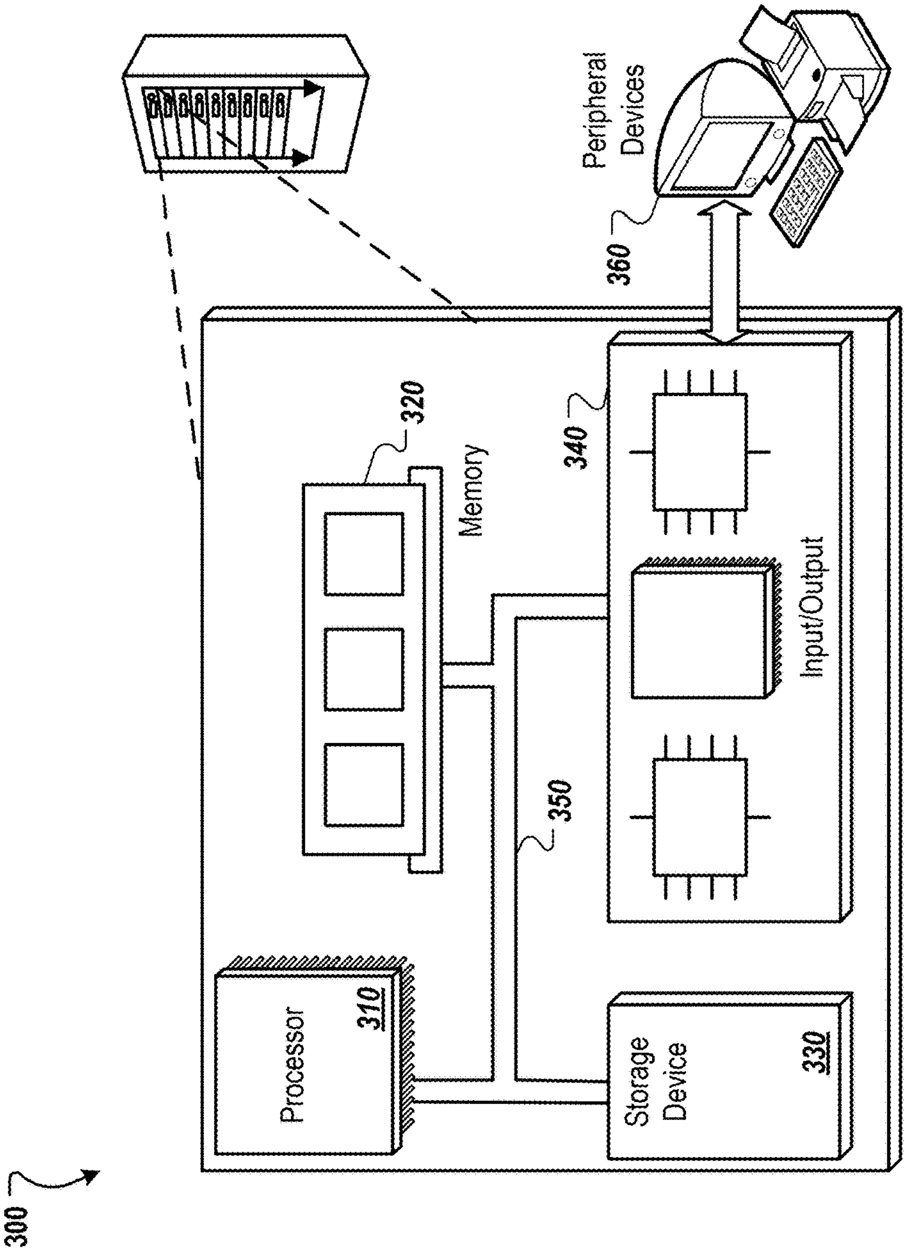
FIG. 3 is a block diagram of an example computer system.

FIG. 3 is a block diagram of an example computer system 300 that can be used to perform operations described above. The system 300 includes a processor 310, a memory 320, a storage device 330, and an input/output device 340. Each of the components 310, 320, 330, and 340 can be interconnected, for example, using a system bus 350. The processor 310 is capable of processing instructions for execution within the system 300. In one implementation, the processor 310 is a single-threaded processor. In another implementation, the processor 310 is a multi-threaded processor. The processor 310 is capable of processing instructions stored in the memory 320 or on the storage device 330.

The memory 320 stores information within the system 300. In one implementation, the memory 320 is a computer-readable medium. In one implementation, the memory 320 is a volatile memory unit. In another implementation, the memory 320 is a non-volatile memory unit.

The storage device 330 is capable of providing mass storage for the system 300. In one implementation, the storage device 330 is a computer-readable medium. In various different implementations, the storage device 330 can include, for example, a hard disk device, an optical disk device, a storage device that is shared over a network by multiple computing devices (e.g., a cloud storage device), or some other large capacity storage device.

The input/output device 340 provides input/output operations for the system 300. In one implementation, the input/output device 340 can include one or more of a network interface devices, e.g., an Ethernet card, a serial communication device, e.g., and RS-232 port, and/or a wireless interface device, e.g., and 802.11 card. In another implementation, the input/output device can include driver devices configured to receive input data and send output data to other devices, e.g., keyboard, printer, display, and other peripheral devices 360. Other implementations, however, can also be used, such as mobile computing devices, mobile communication devices, set-top box television client devices, etc.

Although an example processing system has been described in FIG. 3, implementations of the subject matter and the functional operations described in this specification can be implemented in other types of digital electronic circuitry, or in computer software, firmware, or hardware, including the structures disclosed in this specification and their structural equivalents, or in combinations of one or more of them.

An electronic document (which for brevity will simply be referred to as a document) does not necessarily correspond to a file. A document may be stored in a portion of a file that holds other documents, in a single file dedicated to the document in question, or in multiple coordinated files.

Embodiments of the subject matter and the functional operations described in this specification can be implemented in digital electronic circuitry, or in computer software, firmware, or hardware, including the structures disclosed in this specification and their structural equivalents, or in combinations of one or more of them.

Embodiments of the subject matter described in this specification can be implemented using one or more modules of computer program instructions encoded on a computer-readable medium for execution by, or to control the operation of, data processing apparatus. The computer-readable medium can be a manufactured product, such as a hard drive in a computer system or an optical disc sold through retail channels, or an embedded system. The computer-readable medium can be acquired separately and later encoded with the one or more modules of computer program instructions, such as by delivery of the one or more modules of computer program instructions over a wired or wireless network. The computer-readable medium can be a machine-readable storage device, a machine-readable storage substrate, a memory device, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, a runtime environment, or a combination of one or more of them. In addition, the apparatus can employ various different computing model infrastructures, such as web services, distributed computing and grid computing infrastructures.

A computer program (also known as a program, software, software application, script, or code) can be written in any suitable form of programming language, including compiled or interpreted languages, declarative or procedural languages, and it can be deployed in any suitable form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, special purpose microprocessors. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM (Erasable Programmable Read-Only Memory), EEPROM (Electrically Erasable Programmable Read-Only Memory), and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

In this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

To provide for interaction with a user, embodiments of the subject matter described in this specification can be implemented on a computing device capable of providing information to a user. The information can be provided to a user in any form of sensory format, including visual, auditory, tactile or a combination thereof. The computing device can be coupled to a display device, e.g., an LCD (liquid crystal display) display device, an OLED (organic light emitting diode) display device, another monitor, a head mounted display device, and the like, for displaying information to the user. The computing device can be coupled to an input device. The input device can include a touch screen, keyboard and a pointing device, e.g., a mouse or a trackball, by which the user can provide input to the computing device. Other kinds of devices can be used to provide for interaction with a user as well; for example, feedback provided to the user can be any suitable form of sensory feedback, e.g., visual feedback, auditory feedback, or tactile feedback; and input from the user can be received in any suitable form, including acoustic, speech, or tactile input.

The computing system can include clients and servers. A client and server are generally remote from each other and typically interact through a communication network. The relationship of client and server arises by virtue of computer programs running on the respective computers and having a client-server relationship to each other. Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any suitable form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many implementation details, these should not be construed as limitations on the scope of what is being or may be claimed, but rather as descriptions of features specific to particular embodiments of the disclosed subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination. Thus, unless explicitly stated otherwise, or unless the knowledge of one of ordinary skill in the art clearly indicates otherwise, any of the features of the embodiments described above can be combined with any of the other features of the embodiments described above.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and/or parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the actions recited in the claims can be performed in a different order and still achieve desirable results.

What is claimed is:

1. A computer-implemented method comprising:

receiving, by a first trusted content platform that executes within a first trusted execution environment, a digital component selection response related to a first digital component request sent by a client device, the digital component selection response comprising:

(i) data indicating a set of constrained digital components and, for each constrained digital component, distribution parameters that condition distribution of the constrained digital component; and (ii) data indicating at least one contextual digital component selected according to contextual data related to an environment in which a selected digital component will be displayed;

sending, by the first trusted content platform and to a second trusted content platform that executes within a second trusted execution environment, a second digital component request comprising a set of constraining values corresponding to the first digital component request and the distribution parameters for each constrained digital component in the set of constrained digital components;

receiving, by the first trusted content platform and from the second trusted content platform, data indicating (i) one or more constrained digital components selected based on the set of constraining values and, for each of the one or more constrained digital component, (ii) a selection value generated by the second content platform based on the set of constraining values;

selecting, by the first trusted content platform and from a set of candidate digital components that includes the at least one contextual digital component and the one or more constrained digital components, a given digital component based on a selection value for each contextual digital component and the selection value for each of the one or more constrained digital components; and sending the given digital component to a first untrusted content platform for distribution to the client device.

2. The computer-implemented method of claim 1, wherein the distribution parameters for each constrained digital component comprises an initial selection value and the selection value for each constrained digital component comprises an updated selection value that is generated by updating the initial selection value based on the constraining values for the constrained digital component.

3. The computer-implemented method of claim 2, wherein updating the initial selection value comprises adjusting the initial selection value based on relevance of at least one constraining value of the set of constraining values to at least one distribution parameter for the constrained digital component.

4. The computer-implemented method of claim 2, wherein updating the initial selection value comprises adjusting the initial selection value based on a computed dot product of a vector representing distribution parameters for the constrained digital component and a vector representing the set of constraining values.

5. The computer-implemented method of claim 2, wherein updating the initial selection value comprises adjusting the initial selection value based on matching at least one constraining value of the set of constraining values to at least one distribution parameter for the digital component.

6. The computer-implemented method of claim 1, further comprising:

removing, from the set of constrained digital component and using constraining values, constrained digital components for which a set of constraint criteria is not satisfied to form a set of filtered digital components, wherein selecting from the set of candidate digital components comprises selecting from the set of candidate digital components that excludes the constrained digital components for which a set of constraint criteria is not satisfied.

7. The computer-implemented method of claim 1, further comprising:

receiving, by the first untrusted content platform and from a client device, the first digital component request comprising the contextual data and user data related to a user of the client device;

providing, by the first untrusted content platform and to one or more second untrusted content platforms, a third digital component request comprising the contextual data and that does not include the user data;

receiving, by the first untrusted content platform from the one or more second untrusted content platforms, respective digital component selection responses comprising (i) respective sets of constrained digital components and corresponding distribution parameters and (ii) respective contextual digital components; and providing, by the first untrusted content platform and to the first trusted content platform, fourth digital component request comprising at least a portion of the respective digital component selection responses received from the one or more second untrusted content platforms.

8. The computer-implemented method of claim 7, further comprising:

sending, by the first trusted content platform and to a respective second trusted content platform corresponding to each second untrusted content platform, fourth respective second digital component request; and receiving one or more candidate digital components from each respective second trusted content platforms, wherein the set of candidate digital components comprises the one or more candidate digital components received from each second trusted content platform.

9. The computer-implemented method of claim 8, wherein the user data is encrypted.

10. The computer-implemented method of claim 7, wherein the first trusted content platform and the first untrusted content platform are operated by a first entity, and wherein each second trusted content platform is operated by a same second entity as a corresponding second untrusted content platform.

11. The computer-implemented method of claim 1, wherein the first trusted execution environment is the same as the second trusted execution environment.

12. The computer-implemented method of claim 1, wherein the first trusted execution environment is different from the second trusted execution environment.

13. A non-transitory computer readable medium storing instructions that, when executed by one or more processors, cause the one or more processors to carry out operations comprising:

receiving, by a first trusted content platform that executes within a first trusted execution environment, a digital component selection response related to a first digital component request sent by a client device, the digital component selection response comprising:

(i) data indicating a set of constrained digital components and, for each constrained digital component, distribution parameters that condition distribution of the constrained digital component; and (ii) data indicating at least one contextual digital component selected according to contextual data related to an environment in which a selected digital component will be displayed;

sending, by the first trusted content platform and to a second trusted content platform that executes within a second trusted execution environment, a second digital component request comprising a set of constraining values corresponding to the first digital component request and the distribution parameters for each constrained digital component in the set of constrained digital components;

receiving, by the first trusted content platform and from the second trusted content platform, data indicating (i) one or more constrained digital components selected based on the set of constraining values and, for each of the one or more constrained digital component, (ii) a selection value generated by the second content platform based on the set of constraining values; selecting, by the first trusted content platform and from a set of candidate digital components that includes the at least one contextual digital component and the one or more constrained digital components, a given digital component based on a selection value for each contextual digital component and the selection value for each of the one or more constrained digital components; and sending the given digital component to a first untrusted content platform for distribution to the client device.

14. The non-transitory computer readable medium of claim 13, wherein the distribution parameters for each constrained digital component comprises an initial selection value and the selection value for each constrained digital component comprises an updated selection value that is generated by updating the initial selection value based on the constraining values for the constrained digital component.

15. The non-transitory computer readable medium of claim 14, wherein updating the initial selection value comprises adjusting the initial selection value based on relevance of at least one constraining value of the set of constraining values to at least one distribution parameter for the constrained digital component.

16. The non-transitory computer readable medium of claim 14, wherein updating the initial selection value comprises adjusting the initial selection value based on a computed dot product of a vector representing distribution parameters for the constrained digital component and a vector representing the set of constraining values.

17. The non-transitory computer readable medium of claim 14, wherein updating the initial selection value comprises adjusting the initial selection value based on matching at least one constraining value of the set of constraining values to at least one distribution parameter for the digital component.

18. The non-transitory computer readable medium of claim 13, wherein the instructions cause the one or more processors to perform operations further comprising removing, from the set of constrained digital component and using constraining values, constrained digital components for which a set of constraint criteria is not satisfied to form a set of filtered digital components, wherein selecting from the set of candidate digital components comprises selecting from the set of candidate digital components that excludes the constrained digital components for which a set of constraint criteria is not satisfied.

19. A system comprising:

one or more processors; and one or more storage devices storing instructions that, when executed by the one or more processors, cause the one or more processors to perform operations comprising:

receiving, by a first trusted content platform that executes within a first trusted execution environment, a digital component selection response related to a first digital component request sent by a client device, the digital component selection response comprising:

(i) data indicating a set of constrained digital components and, for each constrained digital component, distribution parameters that condition distribution of the constrained digital component; and (ii) data indicating at least one contextual digital component selected according to contextual data related to an environment in which a selected digital component will be displayed;

sending, by the first trusted content platform and to a second trusted content platform that executes within a second trusted execution environment, a second digital component request comprising a set of constraining values corresponding to the first digital component request and the distribution parameters for each constrained digital component in the set of constrained digital components;

receiving, by the first trusted content platform and from the second trusted content platform, data indicating (i) one or more constrained digital components selected based on the set of constraining values and, for each of the one or more constrained digital component, (ii) a selection value generated by the second content platform based on the set of constraining values; selecting, by the first trusted content platform and from a set of candidate digital components that includes the at least one contextual digital component and the one or more constrained digital components, a given digital component based on a selection value for each contextual digital component and the selection value for each of the one or more constrained digital components; and sending the given digital component to a first untrusted content platform for distribution to the client device.

20. The system of claim 19 wherein the distribution parameters for each constrained digital component comprises an initial selection value and the selection value for each constrained digital component comprises an updated selection value that is generated by updating the initial selection value based on the constraining values for the constrained digital component.

* * * * *